Oct. 4, 1966   P. O. SHULL ETAL   3,277,145
PROCESS FOR PRODUCTION OF SULFURIC ACID ESTERS
Filed July 27, 1961
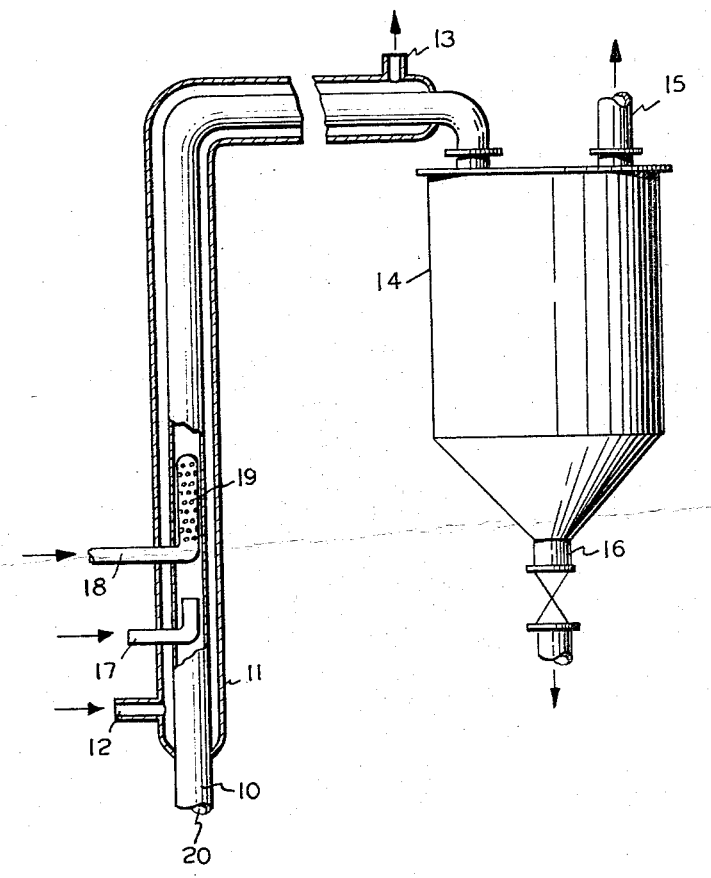
INVENTORS
PETER O. SHULL
ROBERT E. LEARY
DALTON W. ROWLAND
BY
*Walter G. Hensel*
ATTORNEY

United States Patent Office 3,277,145
Patented Oct. 4, 1966

3,277,145
PROCESS FOR PRODUCTION OF SULFURIC
ACID ESTERS
Peter O. Shull, South Plainfield, Robert E. Leary, Westfield, and Dalton W. Rowland, Elizabeth, N.J., assignors to General Aniline & Film Corporation, New York, N.Y., a corporation of Delaware
Filed July 27, 1961, Ser. No. 128,636
5 Claims. (Cl. 260—458)

This application is a continuation-in-part of our co-pending application Serial No. 114,520, filed June 2, 1961, now abandoned.

This invention relates to an improved process and apparatus for preparing sulfuric acid mono-esters by reaction of chlorosulfonic acid with organic compounds containing a primary alcoholic hydroxyl group.

It is known that primary alcohols react readily with chlorosulfonic acid to form sulfuric acid mono-esters with liberation of HCl. The reaction is usually vigorous and exothermic so that local overheating during admixture of the acid and alcohol is difficult to avoid, resulting in undesirable side reactions and decomposition resulting in loss in yield, and discoloration and contamination of the product. Expedients to improve mixing efficiency or to control reaction temperature, employed heretofore to minimize these effects, tend to be cumbersome, inconvenient or incompletely effective.

It is an object of this invention to provide a method and apparatus for preparing sulfuric acid mono-esters by reaction of primary alcoholic hydroxyl-containing organic compounds and chlorosulfonic acid, wherein decompositions and side reactions are minimized, the reaction time is reduced to a minimum, temperature control is facilitated and the desired sulfuric acid mono-ester is produced without substantial discoloration, in high yield and in a high state of purity. In addition, the process and apparatus of the invention are conveniently adapted for continuous operation.

In accordance with this invention, chlorosulfonic acid is progressively sprayed, e.g. in the form of thin layers or jets, into a highly turbulent confined stream of an inert gas (e.g., air or nitrogen) mixed with the primary alcoholic hydroxyl compound to be esterified in liquid phase so as to yield a forth, maintaining the stream in turbulent frothy state during the further advancement thereof for a sufficient period to complete the esterification, and separating the gaseous components from the liquid components of the mixture. Advantageously, the confined portion of the stream is maintained in heat exchange relation with a circulating cooling liquid in order to control the temperature.

In practice, the process is advantageously carried out, for example, in an apparatus illustrated diagrammatically in the accompanying drawing. The apparatus consists of a reaction tube 10 of acid resistant material such as glass or stainless steel (shown partly in cross section), having a jacket 11 with an inlet and outlet 12 and 13 (shown in cross section) for circulation of a liquid cooling medium, the reaction tube being connected at its discharge end to the top of a tank 14 having a gas outlet 15 at the top and a valved discharge orifice 16 at the base for liquids. Adjacent the inlet end 20 of the jacketed reaction pipe 10 there is provided a lateral inlet tube 17 for gases, having its inner end within the tube 10 directed in the direction of flow therein toward the tank 14. Adjacent to the gas inlet tube, and on its downstream side, there is provided a lateral acid inlet tube 18, the inner end of which is provided within the tube 10 with small orifices 19 through which acid can be sprayed in thin streams or jets into the pipe 10.

In operation, a primary alcoholic hydroxyl-containing organic compound in liquid phase (e.g., as such if the compound is itself a liquid, or in the form of a solution thereof in an inert solvent) is progressively introduced through the inlet end 20 of the reaction tube 10 while chlorosulfonic acid is forced as a spray through the orifices 19 of the acid inlet tube 18 into the interior of the stream. The relative rates of introduction of the primary alcoholic hydroxyl compound and the chlorosulfonic acid correspond to the proportions required for the desired esterification. At the same time a massive stream of inert gas such as air or nitrogen is introduced through the gas inlet 17, the gas and the liquid reagents being introduced at sufficiently high rates to cause extreme turbulence in the tube 10 and to produce a froth of gas and liquid. The temperature of the reaction mixture is advantageously controlled by circulating a cooling liquid (e.g., water) through the jacket 11. As the froth discharges into the tank 14, the gaseous components thereof, including HCl formed by the esterification reaction, separate from the liquid esterification mixture and are exhausted through the gas outlet 15.

The process of the invention can be applied for esterification of any organic compound containing a primary alcoholic hydroxyl group wherein any other radicals which it contains and which are reactive toward chlorosulfonic acid under the esterification conditions employed have a lower order of reactivity than the esterifiable primary alcoholic hydroxyl group or groups. Such compounds include mono-hydric primary alcohols and alkylene glycols which may be acyclic or may contain cyclic radicals, ether alcohols such as polyalkylene glycols and mono-ethers of mono- and polyalkylene glycols wherein the terminal ether radical can be an alkoxy or an aryloxy group, mono carboxylic acid esters of mono- and polyalkylene glycols, primary hydroxy carboxylic acids and their alcohol or phenol esters.

When the primary alcoholic hydroxyl bearing organic compound is a liquid, it is advantageously employed as such in the process of the invention, or it can be diluted if desired with an inert solvent. If solid, it can be converted to the liquid phase for purposes of the reaction by dissolving in an inert solvent. Suitable solvents are for example chloroform, trichloroethylene, carbon tetrachloride, 1,4-dioxane or the like. In selecting a solvent for this purpose, it is preferred to select one which yields a relatively concentrated solution of the primary alcoholic hydroxyl-bearing compound, and such a solution is preferably employed to promote faster and more nearly complete esterification of the dissolved compound.

Presence of moisture in the inert gas employed in the process of the invention as well as in the liquid phase containing the hydroxyl compound undergoing esterification is preferably minimized. Most of the moisture which is present reacts with the chlorosulfonic acid to liberate sulfuric acid, representing a loss in yield based on chlorosulfonic acid. Traces of moisture (e.g., up to 0.5% by weight of the liquid phase) can nevertheless be tolerated.

Air is ordinarily satisfactory as the inert gas employed in accordance with the invention. However, if oxidation resulting from presence of oxygen presents a problem, gaseous nitrogen can be used instead.

The volume ratio of air or other inert gas to the liquid phase containing the reagents, and the rate of advancement of the mixture of gas and liquid, as determined by the feed rates, are so selected as to yield a highly turbulent froth at the point where the chlorosulfonic acid is introduced, and to maintain the reaction in a turbulent frothy state up to the discharge end of the tube. The range of proportions of inert gas to liquid reagents required to maintain the aforesaid conditions depends in part on the surface tension characteristics of the liquid.

Generally, however, a suitable volume ratio of gas to liquid ranges from 50 to 1 to 300 to 1. The stream velocity suitable to maintain a highly turbulent condition varies with the diameter and interior surface characteristics of the reaction tube. In a normally smooth surfaced tube having an inside diameter of about 1 inch, overall velocities from about 50 to 100 feet per second have been found suitable. A substantial increase in the diameter of the reaction tube requires an increase in the velocity range while conversely, tubes of smaller size permit a decrease in the velocity range. To insure a high degree of turbulence, the velocity of the gas and liquid stream upon introduction of chlorosulfonic acid should amount to at least several times the critical velocity of the inert gaseous component alone in the same apparatus and similar temperature conditions. Thus, in general, adequate turbulence is obtained when the velocity of the reaction mixture at the point of introduction of chlorosulfonic acid is from 5 to 20 times the critical velocity of the inert gas component thereof in the same apparatus at the same temperature.

The reaction temperature is maintained between 5 and 100° C. and preferably from 20 to 60° C. In general, a temperature of 35 to 40° C. is most satisfactory. Higher temperatures can be used when it is desired to reduce the velocity of liquid reagents and increase the reaction velocity. In the case of primary alcoholic hydroxyl-containing compounds which include other radicals having some reactivity toward chlorosulfonic acid, moderate temperatures are preferred to minimize such side reactions as might otherwise occur. The reaction tube can be conveniently controlled by circulating a cooling liquid through the jacket surrounding the reaction tube.

The reaction mixture should remain in the reaction tube for a sufficient time to effect substantially complete esterification of the primary alcoholic hydroxyl group or groups of the organic compound to be esterified. The time is in any case less than two minutes, but is preferably well below one minute. Generally a suitable period for the reaction is from 0.1 to 1 second within the reaction tube.

Should it be desired to minimize further the concentration of unreacted chlorosulfonic acid at the point of its introduction in the reaction mixture, the acid reagent can be introduced in successive stages along the reaction tube 10 by providing a series of acid inlets similar to that shown in the drawing at 18–19, spaced along the tube 10. In general, introduction of additional inert gas is superfluous, since the gas volume is increased in any case by liberation of HCl as the mixture progresses through the reaction tube 10. However, if desired, additional quantities of air or other inert gas can also be introduced at spaced intervals along the reaction tube.

The process and apparatus of the invention are especially adapted for preparing sulfuric acid mono-esters of alkylphenoxy polyethoxy ethanols. While the phenol ether radical in such compounds is itself susceptible to nuclear sulfonation by reaction with chlorosulfonic acid, it has been found that the procedure according to this invention so minimizes this side reaction as to yield sulfuric acid mono-esters of especially high purity and in excellent yield.

The invention will be more fully understood from the following examples, wherein parts and percentages are by weight unless otherwise indicated.

Example 1

The sulfuric acid mono-ester of nonylphenoxy-polyethoxy-ethanol is prepared in an apparatus as shown in the drawing, wherein the reaction tube 10 is a 1-inch stainless steel pipe (interior cross-sectional area: 0.006 sq. ft.) and the portion extending from the acid inlet 18 to the discharge end at the top of tank 14 is about 22 ft. The gas inlet 17 and acid inlet 18 are of ¼ inch stainless steel tubing, the acid inlet tube being closed at its inner end and laterally perforated with small holes 19 having a diameter of about 0.04 inch.

Nonylphenoxy-polyethoxyethanol (average mol. wt.: 484) in which the ethyleneoxide equivalent of the ethoxyethanol radical amounts to 53% of the total molecule, is introduced at a temperature of 20° C. into the reaction tube 10 at its inlet end 20 at a rate of 423.5 lbs. per hour (corresponding to 6.5 cubic ft. per hour). Simultaneously, chlorosulfonic acid, likewise at 20° C., is injected through the acid inlet tube 18 at the rate of 117.5 lbs. per hour (1.07 cubic ft. per hour), providing a molecular ratio of acid to alcohol of 1.15:1. Meanwhile air at a temperature of 20° C. is concurrently forced through the air inlet tube 17 at a rate of 1250 cubic ft. per hour. The mixture passing through the tube 10 downstream of the air inlet 17 forms a highly turbulent frothy mass of which the minimum velocity is about 58 ft. per second, the static pressure adjacent the acid inlet 18 being about 10 lbs. per sq. in. (gauge). Liberation of gaseous HCl resulting from the esterification of chlorosulfonic acid in the tube 10 increases the gaseous volume by 350–450 cubic ft. per hour so that the stream velocity increases as the mixture progresses toward the discharge end of the tube to as much as 75 ft. per second. Thus, the time required for the mixture to pass through the reaction tube 10 is of the order of 0.3 second. By circulating 20° C. cooling water through the jacket 11, the temperature of the reaction mixture is maintained at about 40° C. The critical velocity of air in a one-inch pipe such as the reaction tube 10 at the reaction temperature is of the order of 7 ft. per second. Thus, the minimum velocity of the frothy mixture at the indicated throughput rate amounts to about eight times the critical velocity of air alone under the reaction conditions.

As the frothy sulfatation mixture discharges into the tank 14, separation of liquid and gas occurs—the liquid sulfatation mass collecting in the tank, and air and HCl passing out through the gas outlet 15, HCl being removed from the issuing gases by scrubbing with water. The sulfatation mass collected in the tank can be further de-gassed on standing, or if desired, by subjecting it briefly to reduced pressure. It is advantageously neutralized with aqueous alcoholic caustic soda to yield an anionic surfactant product. Somewhat less than 10% of the nonylphenoxy-polyethoxyethanol remained unesterified and organically combined sulfuric acid in the mass amounted to substantially one mol per mol of the alcohol initially used. Thus, ring sulfonation of the phenoxy radical accounts for less than 10% of the organically combined sulfuric acid. The surface-active sodium salt of the nonylphenoxy-polyethoxyethyl sulfuric acid ester is of excellent quality and color.

Example 2

The procedure of Example 1 is repeated, except that molten lauryl alcohol (n-dodecanol) at 30° C. is substituted for nonylphenoxy-polyethoxyethanol, the feed rates of the alcohol and chlorosulfonic acid being modified to provide a mol ratio of acid to alcohol of 1.1:1. The feed rate for lauryl alcohol amounted to 298 lbs. per hour (5.75 cubic ft. per hour) and for chlorosulfonic acid 204 lbs. per hour (1.85 cubic feet per hour). The rate of introduction of air and other details of operation are the same as those in Example 1. Sulfuric acid mono lauryl ester is produced in high yield, having excellent quality and color.

Example 3

In the apparatus described in Example 1, a solution of cetyl alcohol in an equal amount of trichloro-ethylene is passed through the reaction tube 10 at a rate of 570 lbs. per hour (8.6 cubic ft. per hour). Chlorosulfonic acid is introduced through the acid inlet 18 at a rate of 150 lbs. per hour (about 1.35 cubic ft. per hour). Air is introduced through the air inlet 17 at the same rate as in the preceding examples. The temperature is maintained at 50–60° C. The sulfatation mass collected in the tank 14 consists primarily of the sulfuric acid mono ester of cetyl alcohol mixed with tri-chloroethylene. The latter can be removed from the sulfatation mixture by distillation at reduced pressure, and the sulfuric ester is then neutralized with aqueous caustic soda to produce sodium cetyl sulfate. Sulfuric acid mono cetyl ester is obtained in high yields, showing no appreciable discoloration, and is of high purity. The sodium salt is especially useful as a surface-active agent.

*Example 4*

Methanol is converted to monomethyl sulfate by passing substantially anhydrous methanol through the reaction tube 10 of the apparatus described in Example 1 at the rate of 100 lbs. per hour (2 cubic ft. per hour) while introducing chlorosulfonic acid at the rate of 400 lbs. per hour (2.27 cubic ft. per hour) through the acid inlet tube 18 and forcing air through the air inlet 17 at the rate of 1,000 cubic ft. per hour. HCl is generated in the course of the passage of the mixture through the tube 10 in amounts of the order of 120 to 125 lbs. per hour whereby the volume of gas within the tube is increased by about 1,400 cubic ft. per hour. The mixture thus passes through the tube 10 as a turbulent foam with a velocity ranging from about 45 to 110 ft. per second. Meanwhile the temperature is maintained at 45 to 60° by circulating cooling water through the jacket 11. Monomethyl sulfate collected in the tank 14 is collected as such, or if desired, is neutralized with a base such as caustic soda. High yields are obtained of monomethylsulfuric acid having excellent purity.

In similar manner, sulfuric acid mono-esters can be prepared from other organic compounds containing primary alcoholic hydroxyl groups, as for example, octylphenoxy-polyethoxyethanol, the monocetyl ether of polyethyleneglycol, mono lauroyl polyethyleneglycol, ethanol, n-butanol, cyclohexanol, hexamethylene glycol, benzyl alcohol, oleyl alcohol, tetrahydroabietinol, n-dodecyl glycolate, tetrahydro furfuryl alcohol.

The sulfuric acid mono-esters are obtained in each case in a high state of purity and at a rapid rate affording utmost simplicity in handling and recovering the desired ester.

Variations and modifications which will be obvious to those skilled in the art can be made in the foregoing examples and operating procedures without departing from the scope or spirit of the invention.

We claim:
1. A process for preparing a sulfuric acid mono-ester which comprises progressively spraying chlorosulfonic acid into a stream of inert gas and a liquid so proportioned as to yield a volume ratio of gas to liquid from 50:1 to 300:1, and moving at a velocity at least 5 times the critical velocity of the gaseous component of said stream in a conduit so as to produce a highly turbulent froth, said liquid containing an organic compound having at least one primary alcoholic hydroxyl group but no other radical of comparable or greater reactivity toward chlorosulfonic acid, continuing advancement of said conduit-confined stream for a period of 0.1 second to 2 minutes while maintaining the temperature thereof between 5 and 100° C., and separating the liquid from the gaseous phase upon discharge of said stream from said conduit at the end of said period.

2. A process as defined in claim 1 wherein said chlorosulfonic acid is sprayed into said stream at a rate corresponding to 1 to 1.15 mols for each chemical equivalent of primary alcoholic hydroxyl group in the compound to be esterified.

3. A process as defined in claim 1 wherein the velocity of said stream ranges from 5 to 20 times the critical velocity of the gaseous component thereof in the same conduit.

4. A process as defined in claim 3 wherein the temperature is maintained between 20° and 60° C.

5. A process for preparing the sulfuric acid mono-ester of an alkylphenoxy-polyethoxyethanol which comprises progessively spraying chlorosulfonic acid into a turbulent frothy stream of air mixed with said alkylphenoxy-polyethoxyethanol in liquid phase, moving through a conduit, wherein the volume ratio of air to liquid ranges from 50:1 to 300:1 and the velocity of said stream ranges from 5 to 20 times the critical velocity of air in said conduit, the rate of introduction of chlorosulfonic acid being 1.10 to 1.15 mols per mol of alkylphenoxy-polyethoxyethanol, maintaining the temperature in said conduit between 20 and 60° C., discharging said stream 0.1 to 1 second after said introduction of chlorosulfonic acid, and separating the liquid from the gaseous components of the discharged mixture.

References Cited by the Examiner

UNITED STATES PATENTS

| | | | |
|---|---|---|---|
| 1,990,113 | 2/1935 | Burghart | 23—260 |
| 2,190,733 | 2/1940 | Richmond | 260—457 |
| 2,332,527 | 10/1943 | Pyzel | 23—260 |
| 2,673,211 | 3/1954 | Blinoff | 260—459 |
| 2,708,675 | 5/1955 | Slaghw | 260—457 |
| 2,864,857 | 12/1958 | Whitney | 260—458 X |
| 2,865,958 | 12/1958 | Davies et al. | 260—504 |
| 2,923,728 | 2/1960 | Falk et al. | 260—458 X |
| 2,931,822 | 4/1960 | Tischbirek | 260—459 |

CHARLES PARKER, *Primary Examiner.*

LEON ZITVER, JOSEPH P. BRUST, *Examiners.*

S. H. LIEBERSTEIN, F. D. HIGEL, *Assistant Examiners.*